(12) United States Patent
    Zafeirakis

(10) Patent No.: US 10,434,947 B2
(45) Date of Patent: Oct. 8, 2019

(54) DRIVER SITTING POSITION CONTROLLED VEHICLE COLLISION AVOIDANCE

(71) Applicant: Georgios Zafeirakis, Glyfada (GR)

(72) Inventor: Georgios Zafeirakis, Glyfada (GR)

(*) Notice: Subject to any disclaimer, the term of this patent is extended or adjusted under 35 U.S.C. 154(b) by 0 days.

(21) Appl. No.: 15/983,126

(22) Filed: May 18, 2018

(65) Prior Publication Data
US 2018/0334102 A1    Nov. 22, 2018

Related U.S. Application Data

(60) Provisional application No. 62/508,678, filed on May 19, 2017, provisional application No. 62/536,488, filed on Jul. 25, 2017.

(51) Int. Cl.
| | | |
|---|---|---|
| *B60R 1/07* | (2006.01) | |
| *B60R 21/015* | (2006.01) | |
| *G06F 3/01* | (2006.01) | |
| *B60R 1/00* | (2006.01) | |
| *B60R 1/12* | (2006.01) | |

(52) U.S. Cl.
CPC ............... *B60R 1/07* (2013.01); *B60R 1/00* (2013.01); *B60R 21/01552* (2014.10); *G06F 3/012* (2013.01); *B60R 2001/1253* (2013.01); *B60R 2300/105* (2013.01); *B60R 2300/802* (2013.01); *B60R 2300/8093* (2013.01)

(58) Field of Classification Search
CPC .... B60R 1/00; B60R 1/02; B60R 1/04; B60R 1/06; B60R 1/07; B60R 1/12; B60R 21/0134; B60R 21/01552; B60R 21/01554; B60R 21/01558
See application file for complete search history.

(56) References Cited

U.S. PATENT DOCUMENTS

| | | | | |
|---|---|---|---|---|
| 2009/0096937 | A1* | 4/2009 | Bauer | B60R 1/12 348/739 |
| 2010/0177412 | A1* | 7/2010 | Lee | B60R 1/02 359/843 |
| 2011/0115615 | A1* | 5/2011 | Luo | B60R 1/00 340/436 |
| 2012/0200705 | A1* | 8/2012 | Saigusa | G06T 7/254 348/148 |
| 2016/0001781 | A1* | 1/2016 | Fung | B60W 40/08 701/36 |
| 2017/0136976 | A1* | 5/2017 | Ohno | B60N 2/888 |
| 2017/0232898 | A1* | 8/2017 | Maejima | B60R 1/002 348/118 |

* cited by examiner

*Primary Examiner* — Sultan Chowdhury
(74) *Attorney, Agent, or Firm* — Franco S. Deliguori; DP IP Group

(57) ABSTRACT

A vehicle collision avoidance system has a camera disposed on a vehicle and arranged to monitor at least one collision prone region adjacent to the vehicle; a sensor positioned within the vehicle and arranged to determine a driver's head position relative to a designated point in the vehicle; a display disposed in view of the driver and coupled to the camera; and a controller configured to control operation of the sensor, the camera and the display. The controller activates the display and the camera to display the at least one collision prone region adjacent to the vehicle when the sensor detects that the driver's head is beyond a threshold distance from the designated point.

24 Claims, 13 Drawing Sheets

DRIVER SITTING POSITION CONTROLLED VEHICLE COLLISION AVOIDANCE

RELATED APPLICATIONS

This application claims priority from U.S. Provisional Patent Application Nos. 62/508,678, filed May 19, 2017 and 62/536,488, filed Jul. 25, 2017, which are incorporated herein by reference in their entirety.

BACKGROUND OF THE DISCLOSURE

Field of the Disclosure

The present disclosure relates generally to vehicle collision avoidance systems. More specifically, the present disclosure relates to a vehicle collision avoidance system providing front blind spot assistance and rearview parking assistance.

Description of the Related Art

Due to the general shape of most automobiles, trucks, heavy machinery, ships, etc., significant blind spots exist for the driver. For example, the driver is generally positioned several feet behind the front bumper of the vehicle in order to accommodate the engine compartment. However, positioning the driver away from the front of the vehicle creates a situation where the driver needs to advance the front portion of the vehicle into an intersection in order to observe oncoming traffic before proceeding across the intersection.

As shown in FIG. 9 representing the prior art, the driver of moving vehicle 901 must move into the intersection 903 in order to have a line of sight 905 that clears a parked vehicle 907. However, in moving into the intersection 903, the driver exposes a significant portion of the front end of the moving vehicle 901 to oncoming traffic. In this situation the moving vehicle 901 risks a collision with an oncoming vehicle if the driver of the oncoming vehicle is distracted or otherwise unable to swerve around the moving vehicle 901.

SUMMARY OF THE DISCLOSURE

This disclosure provides safety and eliminates the stress of the driver allowing him to judge when it is the right time to cross a junction or enter a street with limited side visibility, by enhancing driver's awareness with automation.

An object of the present disclosure is to mitigate the danger of a collision between a vehicle entering an intersection and oncoming traffic.

Another object of the present disclosure is to facilitate reverse parking maneuvers with a vehicle.

Another object of the present disclosure is to facilitate reverse driving maneuvers with a vehicle.

An embodiment of the present disclosure is a vehicle collision avoidance system having: a camera disposed on a vehicle and arranged to monitor at least one collision prone region adjacent to the vehicle; a sensor positioned within the vehicle and arranged to determine a driver's head position relative to a designated point in the vehicle; a display disposed in view of the driver, the display coupled to the camera; and a controller configured to control operation of the sensor, the camera and the display. The controller activates the display and the camera to display the at least one collision prone region adjacent to the vehicle when the sensor detects that the driver's head is beyond a threshold distance from the designated point.

Additionally, the camera is a wide field of view camera disposed on a rear area of the vehicle and arranged to image an area near a rear bumper and a portion of the bumper of the vehicle.

In an embodiment of the present disclosure, a normal field of view camera is disposed on a rear area of the vehicle and arranged to image an area behind the vehicle, the normal field of view camera being coupled to the display and operationally controlled by the controller.

The normal field of view camera and the wide field of view camera are provided in a single camera with a field of view adjustable by the controller.

In an embodiment of the present disclosure, the vehicle collision avoidance system has an electronically adjustable side-view mirror. The side-view mirror is controllably adjusted by the controller in response to the driver's head position. One or more side-view mirrors controllably adjustable by the controller may be provided on the vehicle.

In an embodiment of the present disclosure, the camera is disposed at a forward area of the vehicle and arranged to image a region encompassing both sides of the vehicle forward of a front of the vehicle.

An embodiment of the present disclosure is a vehicle collision avoidance method for a motor vehicle. The method includes the steps of: detecting a body movement by a driver; evaluating the body movement to determine if the body movement exceeds a threshold distance; and activating a collision avoidance process when the body movement exceeds the threshold distance. The body movement is a forward-leaning movement, and the threshold distance is measured from a driver's seat headrest.

Additionally, the collision avoidance process also includes the steps: detecting whether the motor vehicle is in a forward gear; activating a front-view camera when the motor vehicle is in neutral or a forward gear; and transmitting a video signal from the front-view camera to a display viewable by the driver. The front-view camera has at least a 180° field of view forward of the motor vehicle. Alternatively, the front-view camera includes a plurality of cameras configured to provide the 180° field of view.

Another embodiment of the present disclosure is a collision avoidance process that includes the steps: detecting whether the motor vehicle is in a reverse gear; activating a rear-view camera when the motor vehicle is in a reverse gear; and transmitting a video signal from the rear-view camera to a display viewable by the driver. The rear-view camera is configured to provide a view behind the motor vehicle.

The embodiment further includes the steps: processing the video signals to provide a normal field of view to the driver when the body motion is less than the threshold distance and greater than a second threshold distance; and processing the video signals to provide a wide field of view to the driver when the body motion exceeds the threshold distance.

Additionally, an embodiment of the present disclosure includes adjusting one or more side-view mirrors to provide a rear parking view to the driver when the body motion exceeds the threshold distance; and adjusting the side-view mirror to provide a normal driving view to the driver when the body motion is less that the threshold distance and greater than the second threshold distance.

BRIEF DESCRIPTION OF THE DRAWINGS

These and other features, aspects and advantages of the present disclosure will become better understood with regard to the following description, appended claims and accompanying drawings wherein:

DETAILED DESCRIPTION OF THE DISCLOSURE

The present disclosure includes two main components, which combine to provide a comprehensive collision avoidance system. The Forward Blind Spot Assistance component reduces the risk of collision while a driver is attempting to traverse an intersection. Additionally, the Rear View Parking Assistance component allows drivers to safely maneuver a vehicle in reverse, whether for the purpose of backing into a parking spot, parallel parking, or reversing out of a parking spot. While embodiments described herein refer to collision avoidance systems that include both the Forward Blind Spot Assistance component and the Rear View Parking Assistance component, one of ordinary skill in the art may readily implement either component individually without departing from the intent of the present disclosure.

Figure 15:
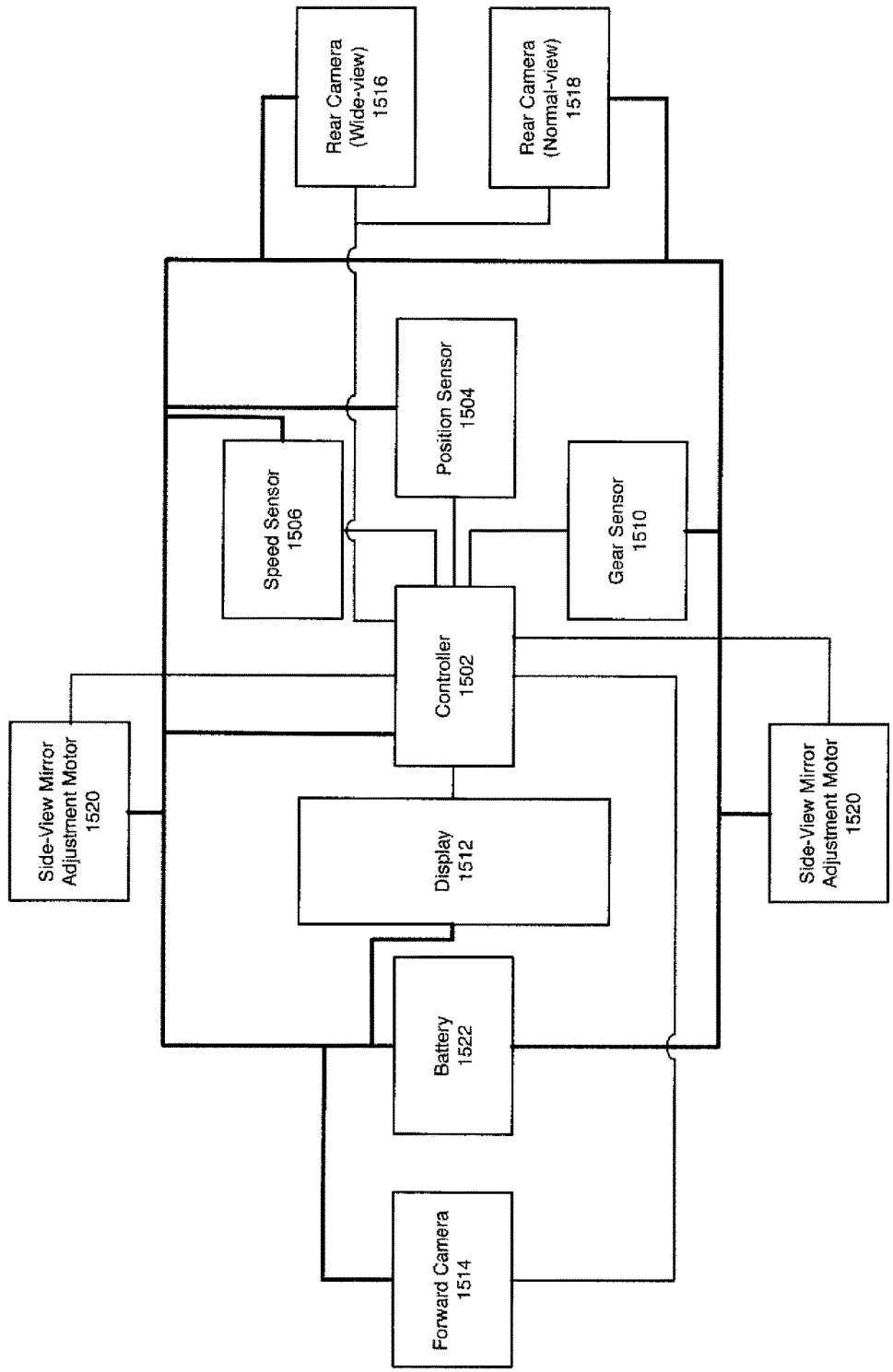
FIG. 15 illustrates a block representation of an embodiment of the present disclosure.

FIG. 15 shows an embodiment of a vehicle collision avoidance system according to the present disclosure. The vehicle collision avoidance system includes a controller 1502 configured to control the various sensors, cameras, motors and display as well as execute a vehicle collision avoidance method, as described herein below. Additionally, the system shown in FIG. 15 includes at least one position sensor 1504, at least one speed sensor 1506, and at least one gear sensor 1510 coupled to the controller 1502. The controller 1502 is also coupled to a display 1512 that is configured to switchably display video imaged by at least one forward camera 1514, at least one rear camera (Wide-view) 1516 and at least one rear camera (Normal-view) 1518. Additionally, the controller 1502 is coupled to side-view mirror adjustment motors 1520. Further, the system shown in FIG. 15 is equipped with a battery 1522 configured to provide energizing power to the various components described above.

The rear camera (Wide-view) 1516 is configured and oriented to image a close in region to the rear bumper as well as imaging the entire length of the rear bumper. In order to accomplish this, the rear camera (Wide-view) 1516 is angled at a downward angle of 45°±10°. At this angle, the driver receives a nearly top-down view near the bumper that allows for closer approaches to obstacles. The driver can safely come very close (few inches) to other cars or obstacles without risk. The wide view helps the driver while exiting a parking place in reverse gear. If other cars or buildings are blocking the driver's view, the close view wide angle camera shows everything that lies on the right and left side behind the car.

The rear camera (Normal-view) 1518 provides a rearward view similar to the view a driver would have by turning to look rearward or if the driver looked at a rearview mirror.

In the embodiment shown in FIG. 15, the position sensor 1504 may include a calibration feature that may be hardware implemented, such as with potentiometers, or software implement, such that the controller provides the driver with a calibration interface on the display 1512. The calibration feature allows the driver to fine tune the position sensor 1504 so that the position sensor 1504 properly interprets the driver's intentions.

Moreover, the system shown in FIG. 15 may include one or more accessory ports (not shown) coupled to the controller 1502. The accessory port protocol may be selected, for example, from USB, serial, IEEE 1394 (i.e., Firewire), IEEE 802.3af (i.e., Power over Ethernet), IEEE 802.11-2016 (i.e., Wi-Fi), Bluetooth, Thunderbolt, or a combination of these interfaces. The one or more accessory ports are coupled to the controller 1502 such that the controller 1502 can control accessory devices connected by way of the accessory port based on the driver's movements.

Thus, when the position sensor 1504 is an image sensor and the controller 1502 is configured to apply a "body language" deciphering algorithm to the driver's motion patterns and gestures, the controller 1504 will be able to provide additional functionality based on the driver's movements and gestures, and the accessory devices connected through the accessory ports.

Forward Blind Spot Assistance (FBSA)

The present disclosure provides the driver of the vehicle with a clear and expanded visual field of moving objects in intersections, without having to enter the intersection.

Figure 9:
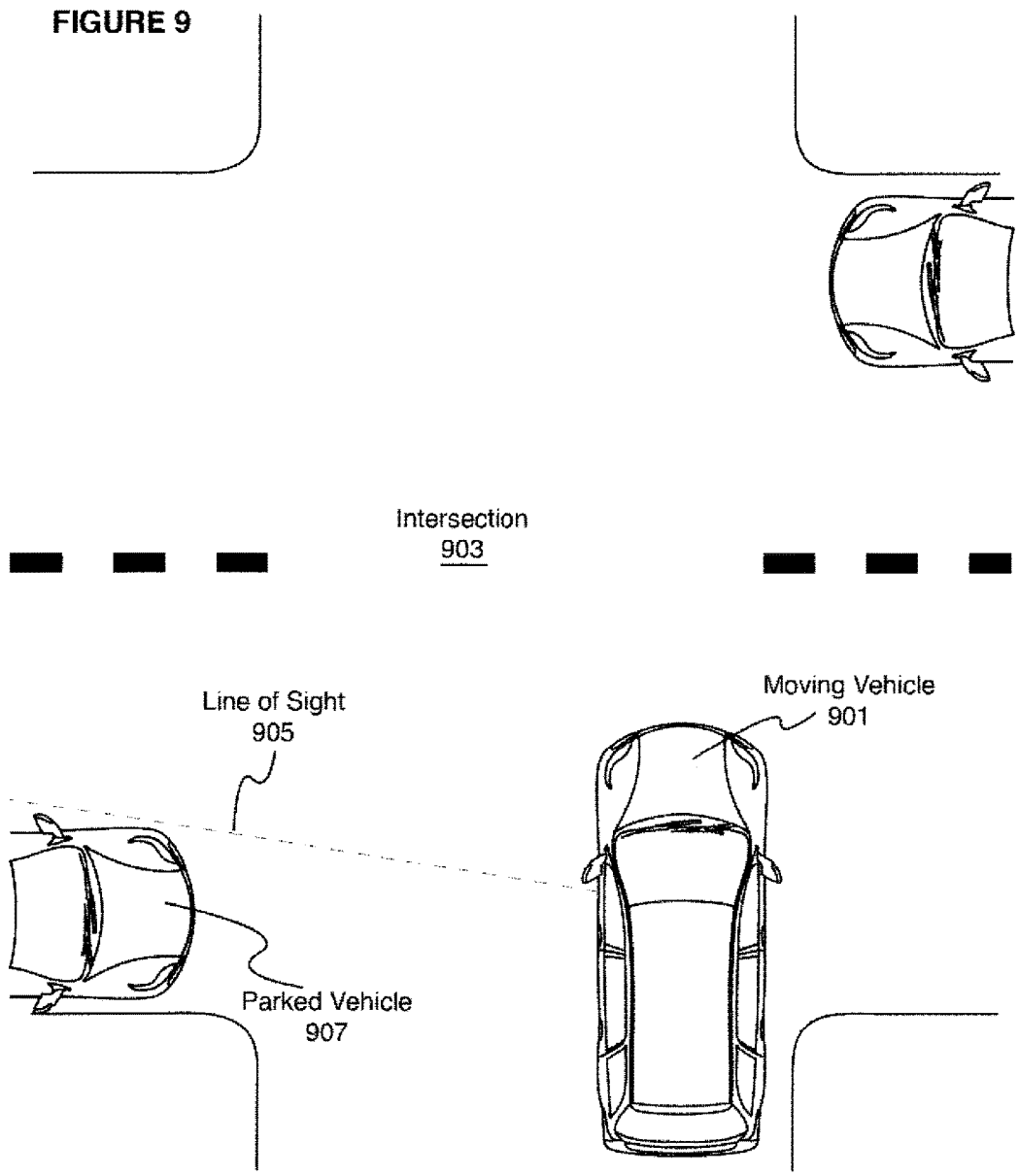
FIG. 9 illustrates a vehicle entering an intersection, in accordance with the prior art.

Many drivers face difficulty when crossing an intersection or exiting a parking spot, due to parked vehicles, walls, big objects or traffic blocking the driver's view. Consequently, a driver will need to enter the intersection to have better visibility. However, by increasing the driver's visibility along the intersection, the driver exposes a significant portion of the front of the vehicle to oncoming traffic. This could potentially lead to an accident as oncoming traffic may not have time and space to avoid the front of the vehicle intending to cross the intersection (See: FIG. 9).

Figure 11:
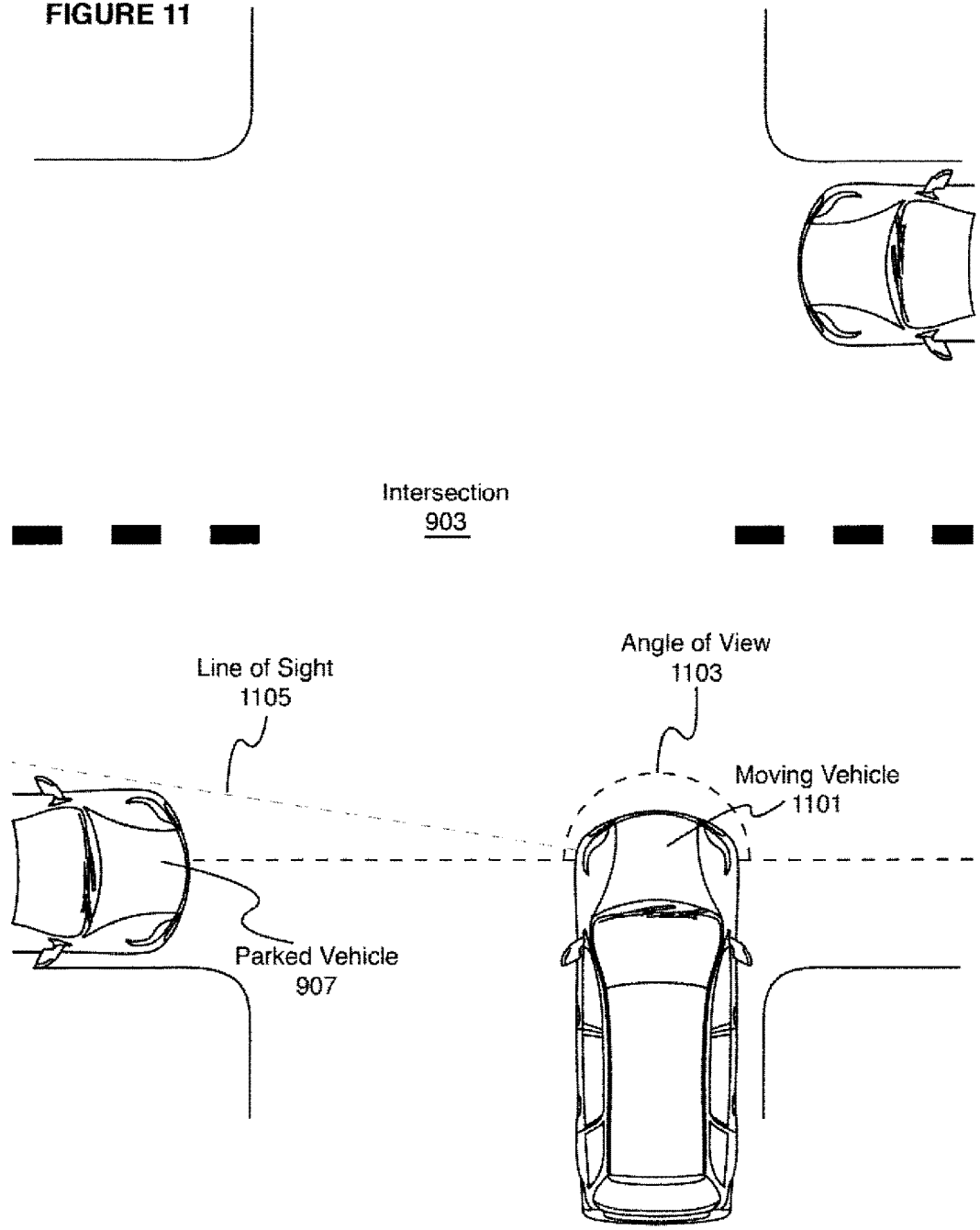
FIG. 11 illustrates a vehicle entering an intersection, in accordance with an embodiment of the present disclosure.

FIG. 11 is a detailed enlargement of the driver's optical field on both sides of the intersection as the vehicle enters the intersection. By placing one or more cameras at the front end of a vehicle 1101, the driver will have an expansive, at least 180°, viewing angle 1103 within an intersection 903 without the vehicle 1101 having to enter the intersection 903 or proceed beyond parked vehicles 907. Consequently, the driver is at a significantly reduced risk of collision with oncoming traffic.

The present disclosure utilizes a driver's natural movement to lean forward in order to achieve a better view of the obstacles to trigger the operation of the vehicle collision avoidance system, i.e. the Forward Blind Spot Assistance system and the Rear View Parking Assistance system. Depending on whether the vehicle is in neutral, forward gear, or reverse gear will determine whether the present disclosure will activate the Forward Blind Spot Assistance system or the Rear View Parking Assistance system once the driver has leaned forward by a predetermined amount.

The present disclosure consists of a camera system, which enlarges the driver's front visual field and a controller that activates the system by receiving signals by one or more sensors placed on the driver's headrest/seat or another appropriate place inside the vehicle. The controller who receives signals from the sensors recognizes the driver's motion relatively to the driver's headrest/seat and activates or deactivates the FBSA and displays a real-time video of the camera system, which is mounted on the vehicle's front hood/grill/bumper/lights/fenders in the vehicle's monitor, accordingly.

The FBSA contains a camera system with one the following layouts:

(1) a 180 degrees (minimum) camera for the front and side view;

(2) two cameras system, one for the right-front side of the vehicle and one for the left-front side of the vehicle; and (3) a wide-angle view angle camera which provides a wide range picture, more than a monitor can show and the controller's software will choose the appropriate framing and zooming for the optimum results.

One or more sensors placed on the back of the seat (or other suitable location) detect the movement relative to the seat's back or headrest. When the driver moves his head/upper body or performs body gestures, the sensor perceives the "body language" of the driver and sends information to the controller, which compares the driver's movement to the predefined body gestures and determines how to react. The controller activates the camera system and monitor to provide the driver with a view of the front and side view.

The present disclosure is a system that provides optical feedback to the driver in case obstacles are blocking the view to the left or/and right side of the vehicle.

The FBSA helps to increase safety level by providing adequate visible field when the vehicle is approaching a junction or exiting parking spots or any other situation that the driver is not sure if it is safe to move forward.

The distance between the driver's head (eyes) and the vehicle's front end is a total of the distance between the driver's head and the lowest part of the windshield, plus the length of the hood plus the length of the grill/bumper. As a result, the driver's eyes are situated 1 m to 3 m (e.g., 2.6 m for BMW Z4) behind the vehicle's front bumper. This distance varies by vehicle model and body type, as sport vehicles have long hood and the driver's position is low while Sport Utility Vehicles (SUV) tend to have a shorter hood and higher driving position.

Consequently, when an obstacle is blocking the driver's view, the driver is forced to drive forward until his head has clear side view, but at the same time part of the vehicle has moved into the junction with risk of side impact with, for example, a vehicle, bicycle or motorcycle.

In case of approaching a junction where visibility is limited due to obstacles, the driver's natural reaction is to lean forward to improve visibility by altering his view angle. As a result, the distance between driver's torso/head and the back of the seat is increased.

Referring again to FIG. 15, the controller 1502 coupled to the position sensor 1504 installed inside the cabin monitors the natural reactions of the driver to determine the driver's intent. The position sensor 1504 provides measurements regarding the driver's position relatively to the vehicle seat/headrest. The position sensor 1504 may be a proximity sensor that registers distance between itself and an object (i.e., the driver) or the position sensor 1504 may be an image sensor, such as a CCD sensor or a CMOS sensor, configured to register the driver's posture, arm and hand gestures, and head movements. The image sensor may further be configured to identify eye movements.

When the position sensor 1504 is an image sensor, the controller 1502 can be configured to apply a "body language" deciphering algorithm to the driver's motion patterns and gestures. As a consequence, the controller 1504 will be able to provide additional functionality based on the driver's movements and gestures.

Moreover, the controller receives data from a speed sensor 1506 coupled to the driveshaft (not shown), or other appropriate structure, and a gear sensor 1508 coupled to the vehicle's transmission, or other appropriate structure. The speed sensor 1506 provides the controller 1502 with data regarding the vehicle's current velocity. The gear sensor 1510 provides data to the controller 1502 regarding whether the vehicle is in a reverse gear or a non-reverse gear (i.e., neutral or a forward gear). The controller 1502 performs calculations, factoring in the data from the position sensor 1504, the speed sensor 1506 and gear sensor 1510, to determine the driver's intention/need and engages the appropriate systems.

For example, if the gear sensor 1510 detects that the vehicle is in a non-reverse gear and the speed sensor 1506 detects the vehicle velocity to be below a speed threshold velocity of, for example 6 MPH, the controller 1502 will interpret a driver's forward leaning to be indicative of a situation in which an enhanced view of the forward of the vehicle is desired. Thus, the controller 1502 activates a forward camera 1514 and transmits images from the forward camera 1514 to a display 1512 situated so as to be viewable by the driver. However, if the speed sensor 1506 detects a vehicle velocity that exceeds the speed threshold, the controller 1502 will ignore the detected forward leaning of the driver.

While the above example refers to a speed threshold of 6 MPH, other appropriate values may be used instead as dictated both by practicality and local traffic laws relating to a driver interaction with a live video display. For example, a speed threshold of 10 MPH may be considered appropriate. Conversely, the speed threshold may need to be set to 0 MPH in certain municipalities. Therefore, the present disclosure contemplates a speed threshold having any value between, and including, 0 MPH and 10 MPH to be within the scope of the embodiments described herein. Additionally, the present embodiment describes a forward camera 1514 which, for example, may be a single camera capable of providing a wide field of view, preferably at least 180°. If the forward camera 1514 is a single wide-view camera, the camera should preferably be angled at a 45° downward angle. Alternatively, the forward camera 1514 may be an assembly of several cameras, e.g., two cameras configured to provide an overlapping 180° view of an intersection, or even a greater than 180° view.

Figure 10:
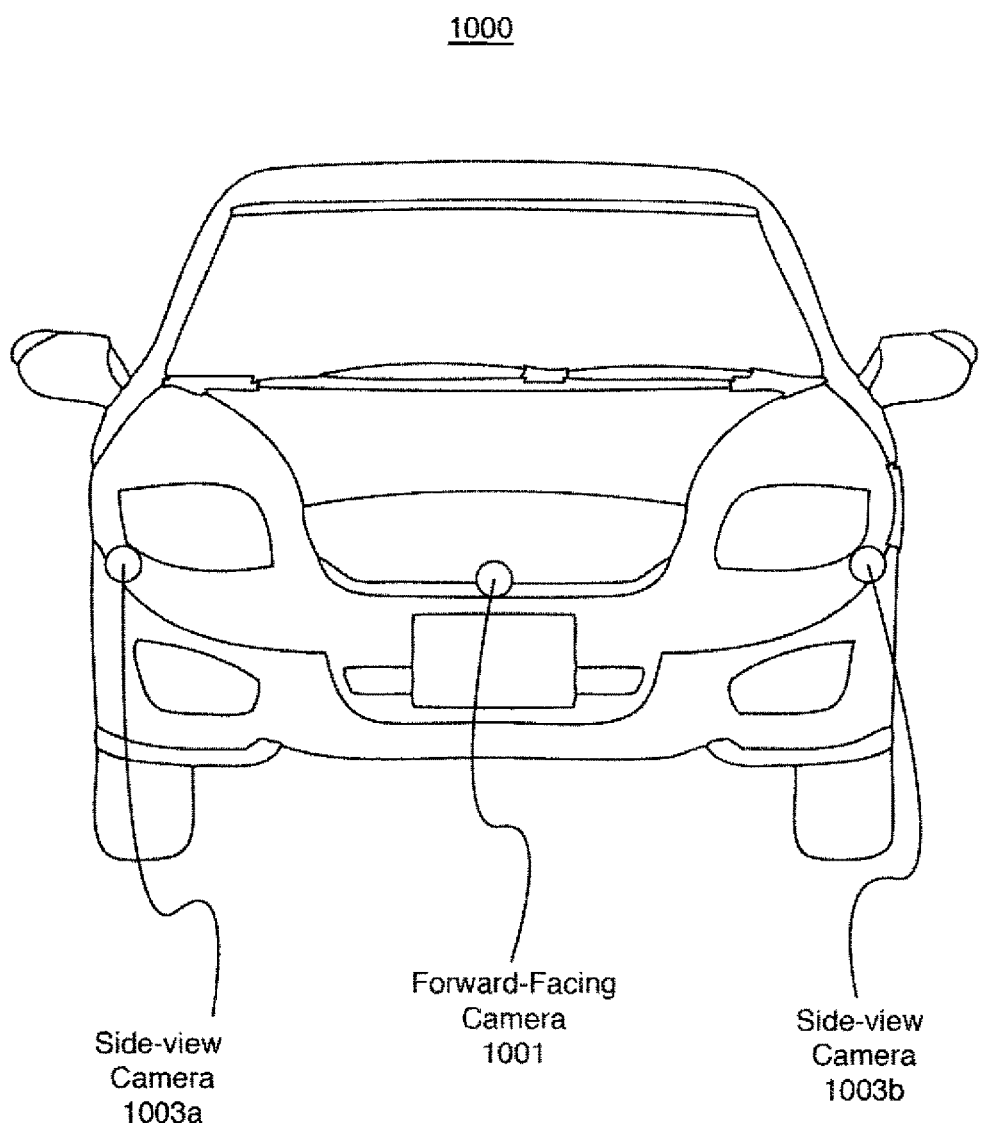
FIG. 10 illustrates a front view of a vehicle exterior, in accordance with an embodiment of the present disclosure.

Referring to FIG. 10, with a two-camera system, the cameras 1003a and 1003b may be positioned at opposite corners of the forward portion of the vehicle. Alternatively, a third camera 1001 may be positioned on the front of the vehicle 1000 centrally along the vehicle's long axis. The controller 1502 may include a signal-processing module (not shown) to edit and combine the video received from the forward camera 1514 to provide the driver with the best perception of the surroundings.

In an embodiment, the controller 1502 may be configured to select individual cameras of the forward camera 1514 in response to the driver's movements, such that visibility is increased on the left side, right side, or full 180° view.

Moreover, in an embodiment the controller 1502 communicates with a GPS system (not shown) so that when the driver is close to an intersection with a one-way street, the system activates only the camera showing the direction from which vehicles are expected to come.

The driver's motions are categorized in driving mode [D] (FIG. 3) in which a driver is seated with a normal posture; and the leaning forward mode [LFM] (FIG. 4) in which the vehicle's speed is low (under 6 mph) or the vehicle does not move at all, reverse gear is not engaged, and the driver exhibits a forward leaning posture to gain better visibility.

When the driver is in driving mode [D] his head is placed close to the seat's headrest and the FBSA system is in standby mode. When the vehicle velocity is low (e.g., under 6 mph), reverse gear is not selected and the driver leans forward, the system activates the FBSA system and:

1) The front camera or side-front camera is activated, and
2) The vehicle's monitor input is switched to show video from the camera.

The video provided by the front camera is a single plan showing left and right direction of the vehicle, covering at least 180 degrees, or a combination of two videos from two or more different video cameras (i.e., multi-camera configuration), one showing towards the left side of the vehicle and the other towards the right side of the vehicle. Thus, with respect to the present disclosure, it is understood that reference to a "front camera" refers to any configuration of one or more forward positioned cameras, and is not intended to limit any embodiment described herein to a singular front camera.

The multi-camera configuration is more effective in cases where the vehicle is approaching the intersection at an angle rather than perpendicular to the intersecting street. The multi-camera configuration eliminates the risk of a blind spot on the side that the vehicle and the intersecting street form the smaller entering corner.

Figure 3:
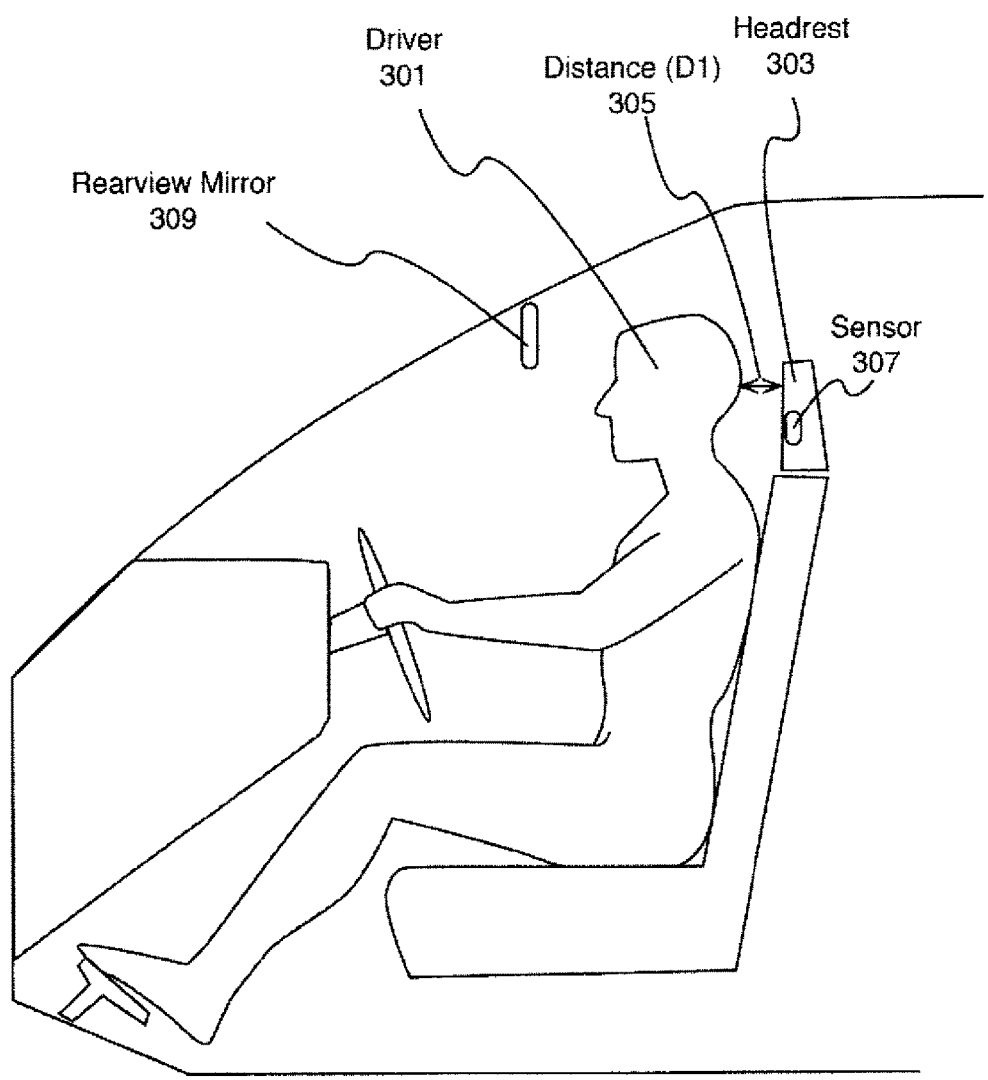
FIG. 3 illustrates a vehicle interior showing a driver positioned for driving, in accordance with an embodiment of the present disclosure.
Figure 4:
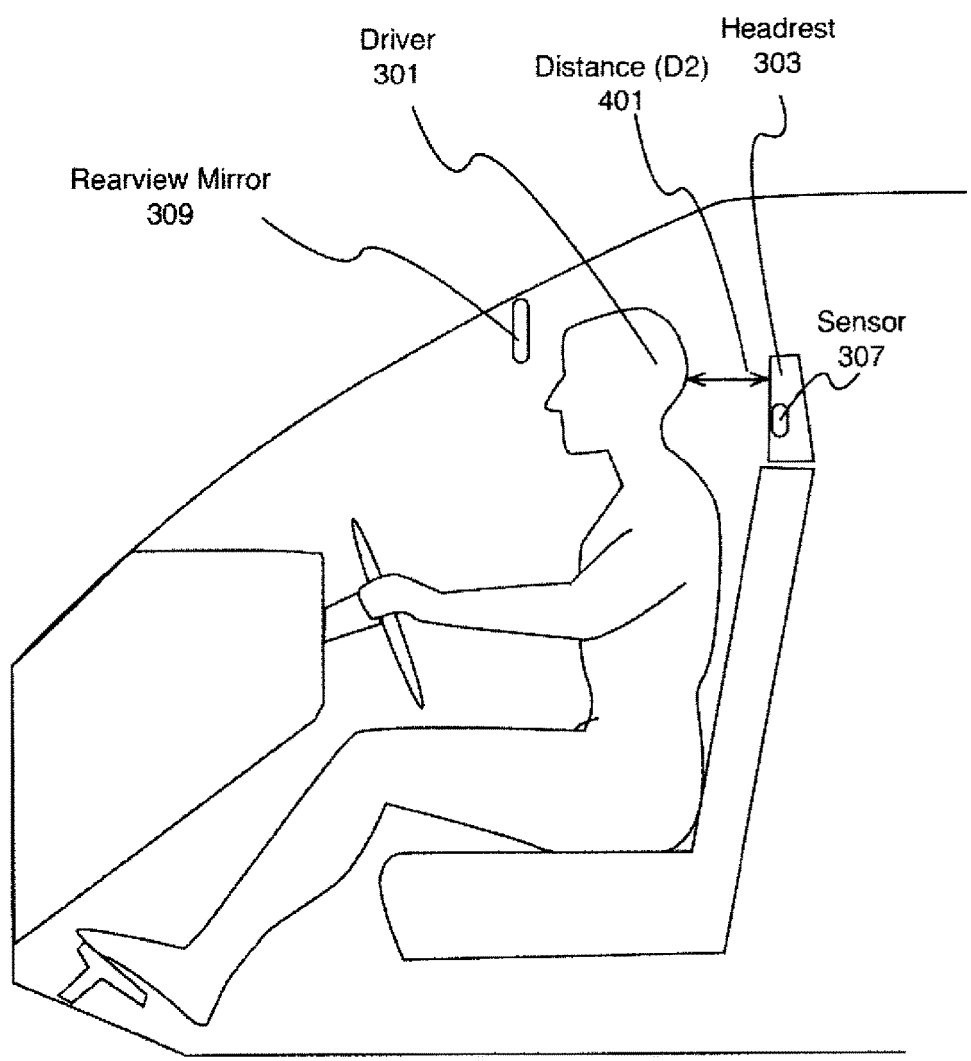
FIG. 4 illustrates a vehicle interior showing a driver in a lean-forward position, in accordance with an embodiment of the present disclosure.

Referring to FIGS. 3 and 4, when the driver 301 is approaching an intersection or exiting a parking spot and nearby obstacles are blocking the view, the driver will tend to move towards the steering wheel. This is a natural movement of the driver 301. The system uses this natural movement as a body gesture, which activates the controller to engage the camera and monitor. The result of the driver 301 leaning forward is that the distance between the head 301 and the headrest 401 is increased.

The position sensor 307, which can be placed on/under the headrest 303, or in another suitable position inside the vehicle's cabin, recognizes the movement of the driver 301 and activates the front camera which provide the driver with improved visibility of the intersection without the vehicle's grill significantly crossing the road line.

The position sensor 307 can be a proximity sensor, a camera or another suitable sensor as known in the art, which recognizes the alteration of the distance of the driver 301.

When the maneuver ends, the driver's head moves back to the deactivation threshold position and the FBSA is set to standby mode. The "home" screen of the vehicle's multimedia system is restored and the front camera is deactivated.

Rear View Parking Assistance (RVPA)

Another embodiment of the present disclosure is a Rear View Parking Assistance (RVPA) that alters a driver's visible field, according to the driver's needs, when driving in reverse or driving in reverse gear for a parking maneuver.

The RVPA system may implement the rear cameras using several methods, such as:

(1) a two-camera system, one for the distant rear view and the other one for the closer rear obstacles;
(2) a camera with two signal outputs, one for the distant rear view and the other one for the closer rear obstacles; and
(3) a wide-angle view angle camera which provides a wide range picture, more than a monitor can show, with the controller selecting the appropriate framing and zooming for the optimum results.

When the car moves in reverse, the rear camera provides a wide view of the rear side of the car, giving the driver the ability to see remote obstacles. When the vehicle approaches the obstacle in a closer distance, the controller alters the view's framing and the driver may evaluate accurately the distance between the car's rear bumper and the obstacle(s).

The combination of altering the rear camera(s)' view angle and the zooming of the rear image assists the driver to perform a reverse maneuver safer and faster by providing him with an overall visibility.

Referring back to FIG. 15, the RVPA is a system which monitors the driver's position/motion to determine which visible field is more helpful for the driver. Depending on the driver's movements, the controller 1502 adjusts the tilting angle of the one or more side-view mirrors by controlling the side-view mirror adjustment motors 1520 in order to increase the driver's visibility on the side and behind of the vehicle.

The driver's motions are categorized in driving mode [D], which consists of the driving forward [DF] mode, the driving backwards [DB] mode, and the reverse & parking mode [RP].

When the driver is in driving mode [D] his head is placed close to the seat's headrest, as shown in FIG. 3, and the gear sensor 1510 detects that the vehicle is in a forward gear. In this situation, the RVPA system is placed in standby mode by the controller 1502. In the embodiment of FIG. 3, the driver's head is shown to be located at a distance D1 designated by reference numeral 305.

Figure 5:
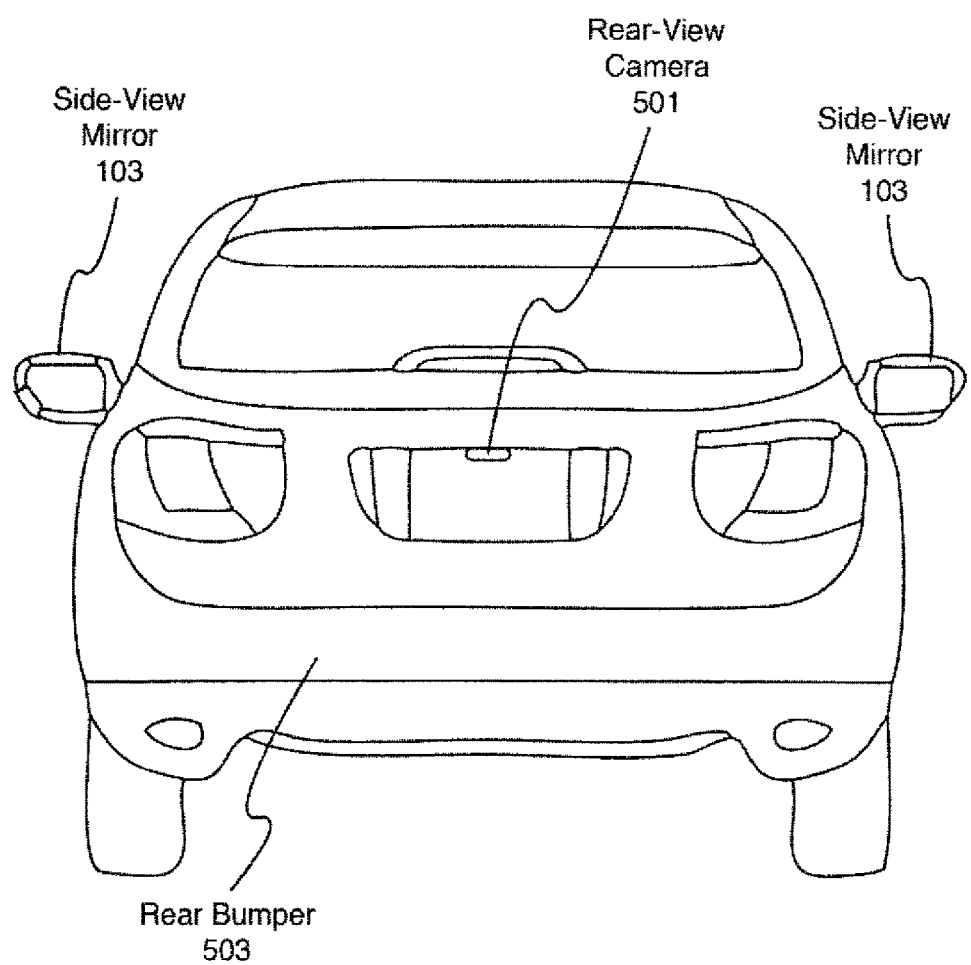
FIG. 5 illustrates a rear view of a vehicle exterior, in accordance with an embodiment of the present disclosure.
Figure 6:
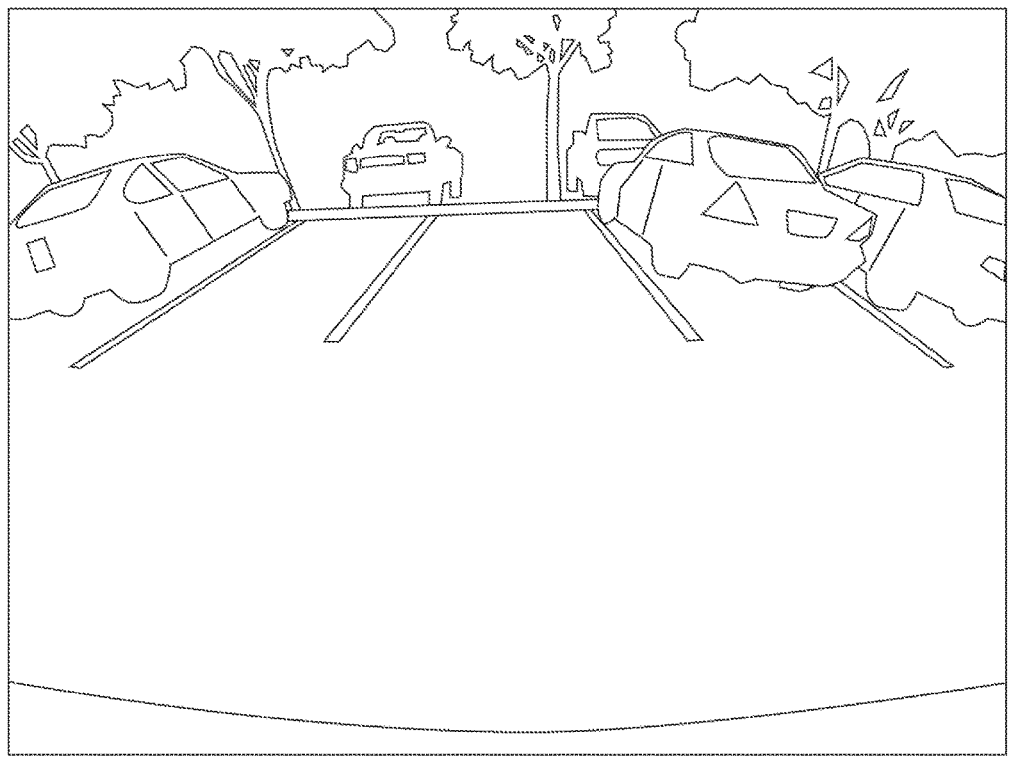
FIGS. 6-8 illustrate rear-view parking camera views, in accordance with an embodiment of the present disclosure.
Figure 7:
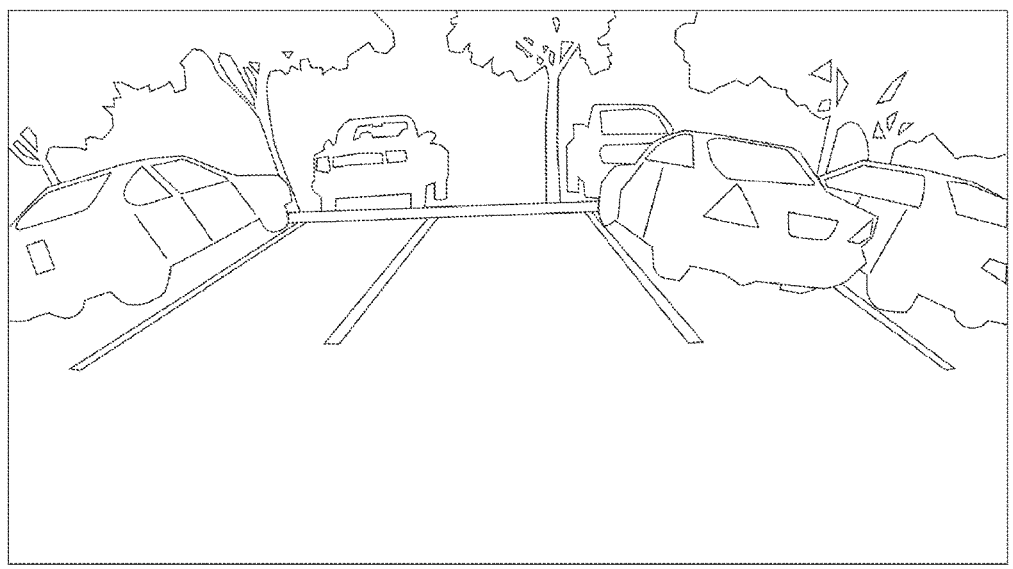

When the driver places the vehicle in a reverse gear, the gear sensor 1510 registers the change and provides the data to the controller 1502. The controller 1502 activates the rear camera (Normal-view) 1518 in order to increase the driver's visibility behind the vehicle. The rear camera (Normal-view) 1518 shows an image from the rear bumper 503 (See: FIG. 5) to the direction behind the vehicle as shown in FIGS. 6 and 7.

Figure 2:
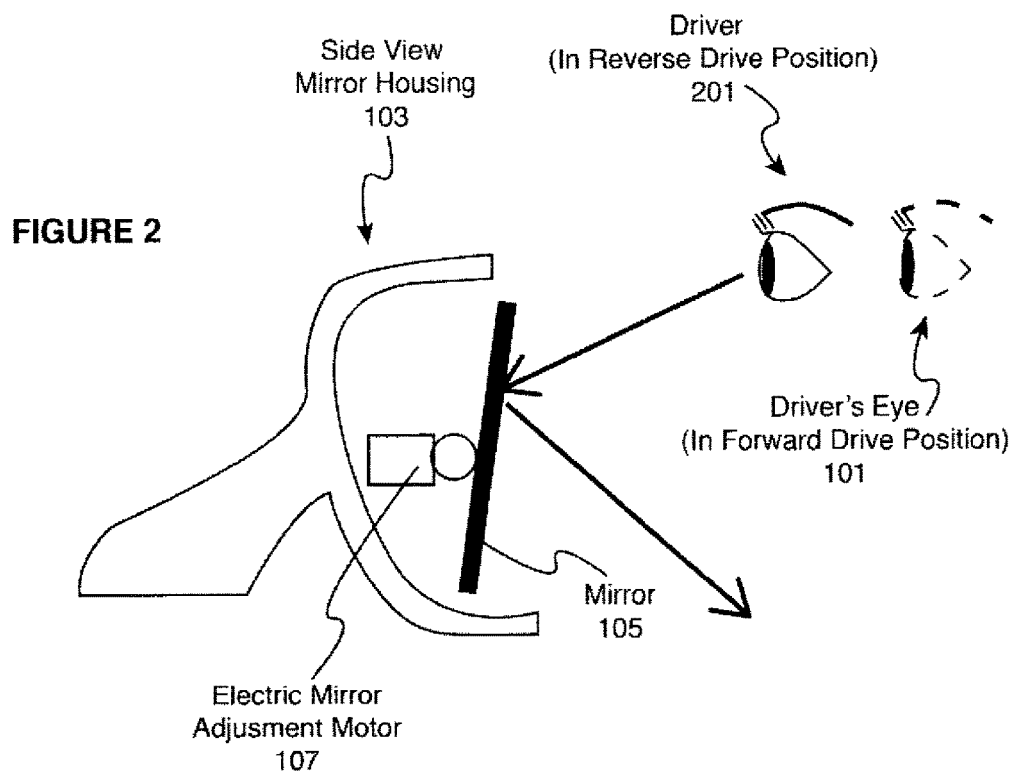
FIG. 2 illustrates a side-view mirror of a vehicle adjust for viewing obstacles during reverse driving/parking, in accordance with an embodiment of the present disclosure.

When the driver wishes to increase the side visibility of the vehicle, the driver leans forward (See: FIG. 4), moving his/her body closer to the steering wheel such that the driver's head is located at a distance D2, designated by reference numeral 401, which is greater than distance D1. Thus, the distance 401 between the driver's head and the headrest 303 is increased. The position sensor 307, placed on the headrest 303 or to other suitable place inside the vehicle's cabin, detects the movement of the driver 301, causing the controller 1502 to activate the side-view mirror adjustment motors 1520 to alter the tilt of the one or more side-view mirrors, as shown in FIG. 2. The altered tilt of the mirror changes the driver's view angle on the sides of the vehicle, thereby improving the visibility of the driver 301 in a reverse parking maneuver. Additionally, the controller 1502 switches video feed to the display 1512 from the rear camera (Normal-view) 1518 to the rear camera (Wide-view)

Figure 8:
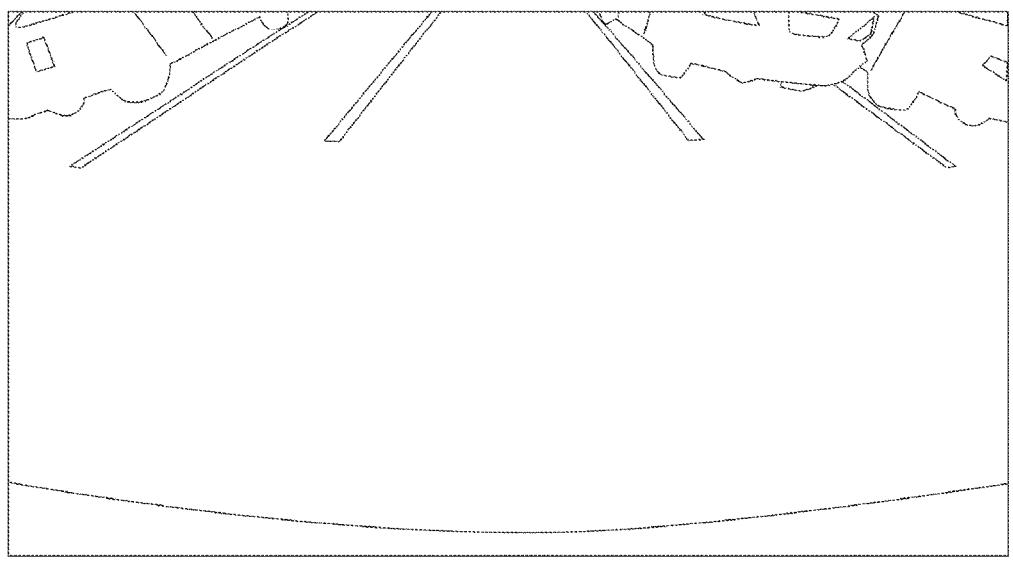

1516. The rear camera (Wide-view) 1516 provides a view of the rear of the vehicle closer to the bumper, such as shown in FIG. 8.

The position sensor 307 can be a proximity sensor, a camera or another sensor, which recognizes the alteration of the distance of the driver's head 301. More specifically, the sensor 307 is placed within the vehicle, e.g., inside the vehicle's cabin, and is configured to determine the driver's head position relative to a predetermined or designated point in the vehicle. In the embodiment shown in FIGS. 3 and 4, the designated point is a surface of the headrest 303 as described above. The position of the sensor 307 depends on the type of vehicle and/or the vehicle manufacturer.

When the reverse or the parking maneuver ends, the driver 301 deselects the reverse gear, the RVPA is set to standby mode, the side mirrors are restored in their original position and the rear camera 501 is deactivated.

The present embodiment describes a rear camera (Normal-view) 1518 and a rear camera (Wide-view) 1516 as separate cameras. However, a single camera can provide both the wide-view and the narrow-view functionalities, either by electronically controlled optics or via software-based image processing to crop a wide-view image such that only the normal-view is provided when appropriate. The zooming between the wide-view image and the normal-view image can be proportional to the degree of forward movement of the driver beyond the activation threshold.

In an embodiment, the controller 1502 provides a wide view and a narrow view to the display 1512 simultaneously, such that the video from both the rear camera (Wide-view) 1516 and the rear camera (Normal-view) 1518 are displayed in a split-screen view on the display 1512.

Figure 1:
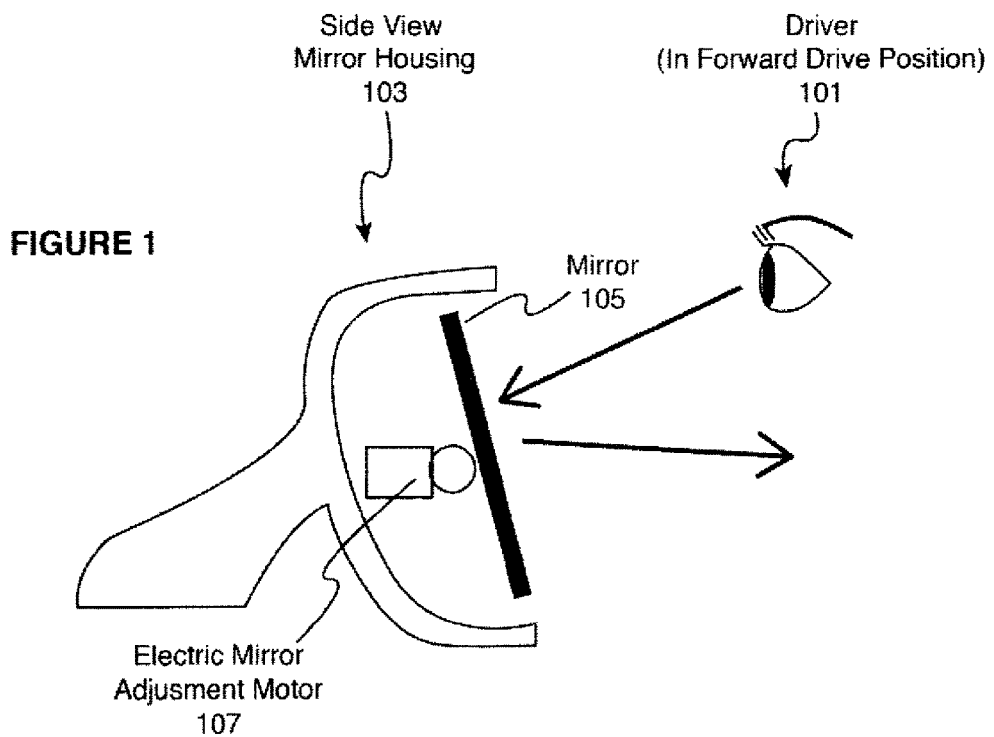
FIG. 1 illustrates a side-view mirror of a vehicle adjusted for driving, in accordance with an embodiment of the present disclosure.

Referring to FIGS. 1 and 2, the vehicle's mirror tilting mechanism 107 can be adjusted in two different positions, the driving mode [D], shown in FIG. 1, or the reverse and parking mode [RP], shown in FIG. 2. Alternatively, mirror tilting can be proportional to the driver's head distance from the headrest 303.

In FIG. 1, the view angle of the driver 101 is illustrated when he/she is driving forward or backwards. The mirror tilting mechanism 107 has been set to the default settings that the driver 101 has arranged for everyday use.

In FIG. 2, the difference in the driver's view angle is depicted when the driver changes from the driving position [D] to the reverse parking position [RP] which means that driver has pulled closer to the steering wheel in order to see the obstacles which are not visible when in the driving mode [D].

The display disclosed in the embodiments above may be the display utilized for vehicle navigation, a display dedicated to providing the vehicle collision avoidance system, or any other appropriately configured video display device. In an embodiment, the display may be incorporated into the rearview mirror 309, shown in FIG. 3. The display may utilize any suitable display technology known to one of ordinary skill in the art, for example OLED, LED, and ePaper, as appropriate.

Combined FBSA & RVPA

Figure 12:
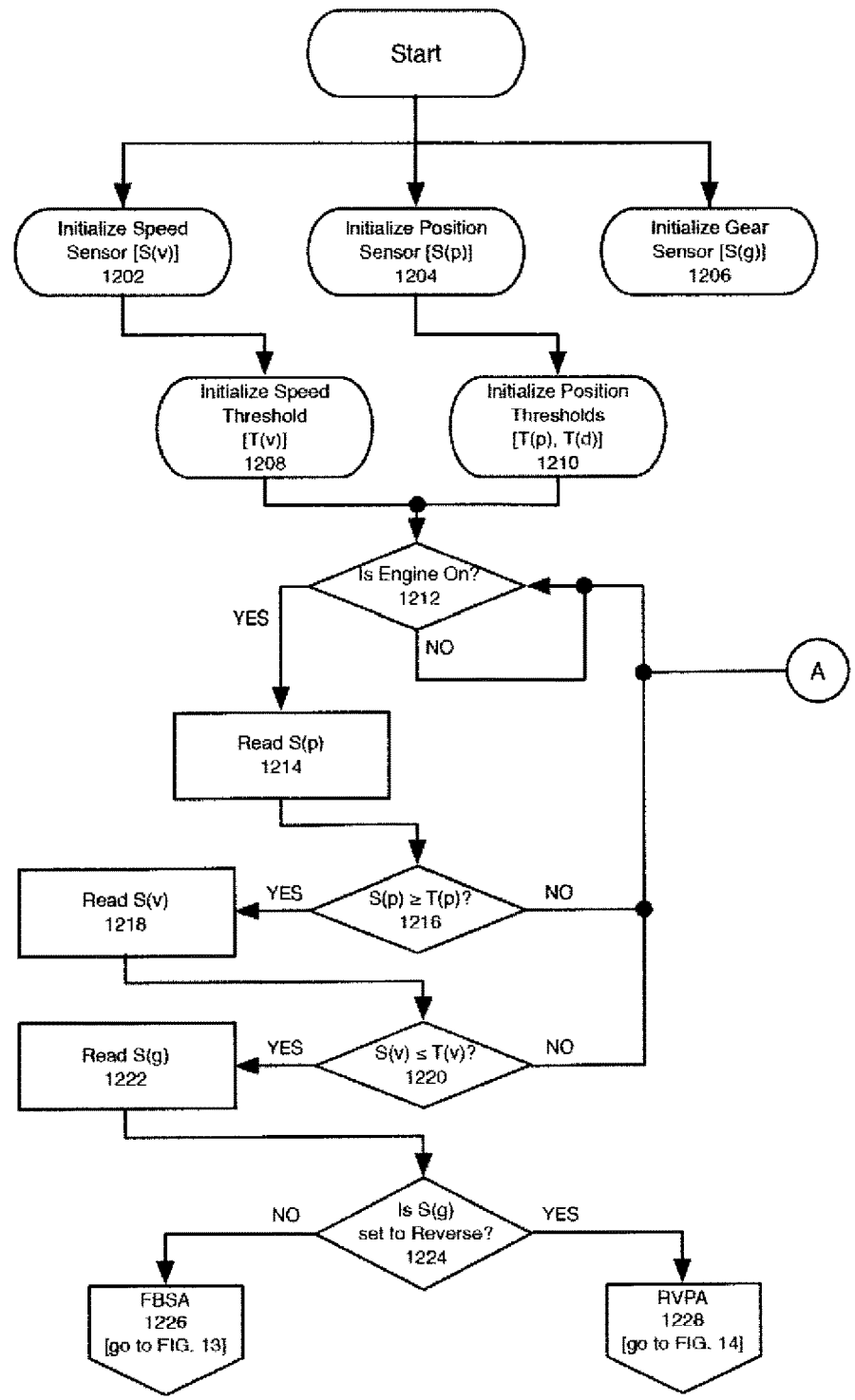
FIGS. 12-14 illustrate a process in accordance with an embodiment of the present disclosure.

Referring to FIG. 12, an embodiment of the present disclosure performs the process illustrated therein. In the present embodiment, a process for providing vehicle collision avoidance begins once a driver turns the ignition key to the accessory position, with initialization of a vehicle speed sensor ($S_{(v)}$) at step 1202. In addition, a position sensor (S(p)) is initialized in step 1204. The position sensor ($S_{(p)}$) is configured to determine the position of the driver's head with respect to a predefined point on the driver's seat. As described above, in an embodiment of the present disclosure, the predefined point is located on the driver's headrest. Further, a gear sensor ($S_{(g)}$) is initialized at step 1206. The gear sensor ($S_{(g)}$) determines the gear that the vehicle is in. Specifically, the gear sensor ($S_{(g)}$) determines whether the vehicle is in a reverse gear or a non-reverse gear (i.e., neutral or a forward gear).

The process proceeds to step 1208 where the process initializes a speed threshold ($T_{(v)}$) above which the process will discontinue displaying camera video to the driver. The purpose of the speed threshold ($T_{(v)}$) is to avoid distracting the driver during normal driving. Moreover, many states in the United States of America prohibit displaying video feeds to a driver during normal driving as this is a significant distraction that can lead to collisions. Thus, the speed threshold ($T_{(v)}$) is set to a value indicative of situations involving parking, pulling out of a parking space, cautiously entering an intersection or other similar scenarios. For example, in one embodiment the speed threshold ($T_{(v)}$) may be set to any value below 10 miles per hour, and in another embodiment the speed threshold ($T_{(v)}$) may be set to 5 miles per hour.

Figure 13:
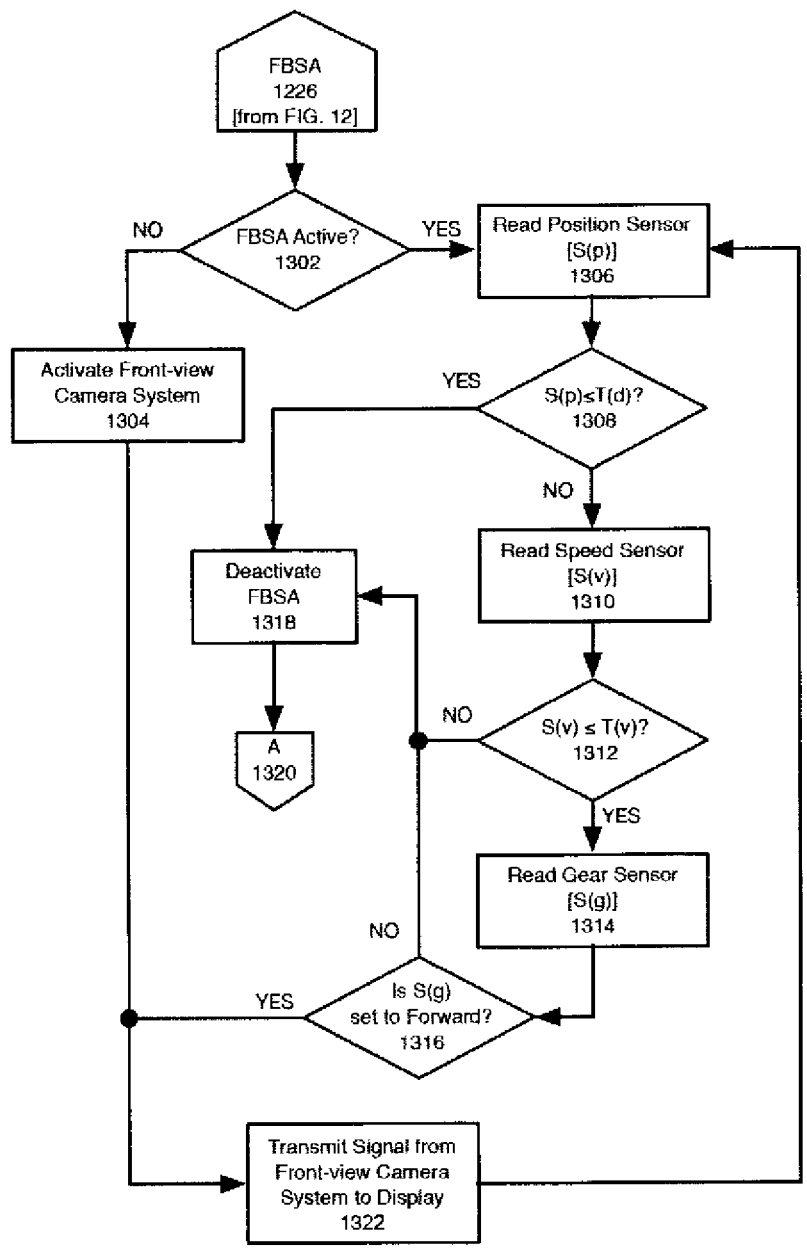
Figure 14:
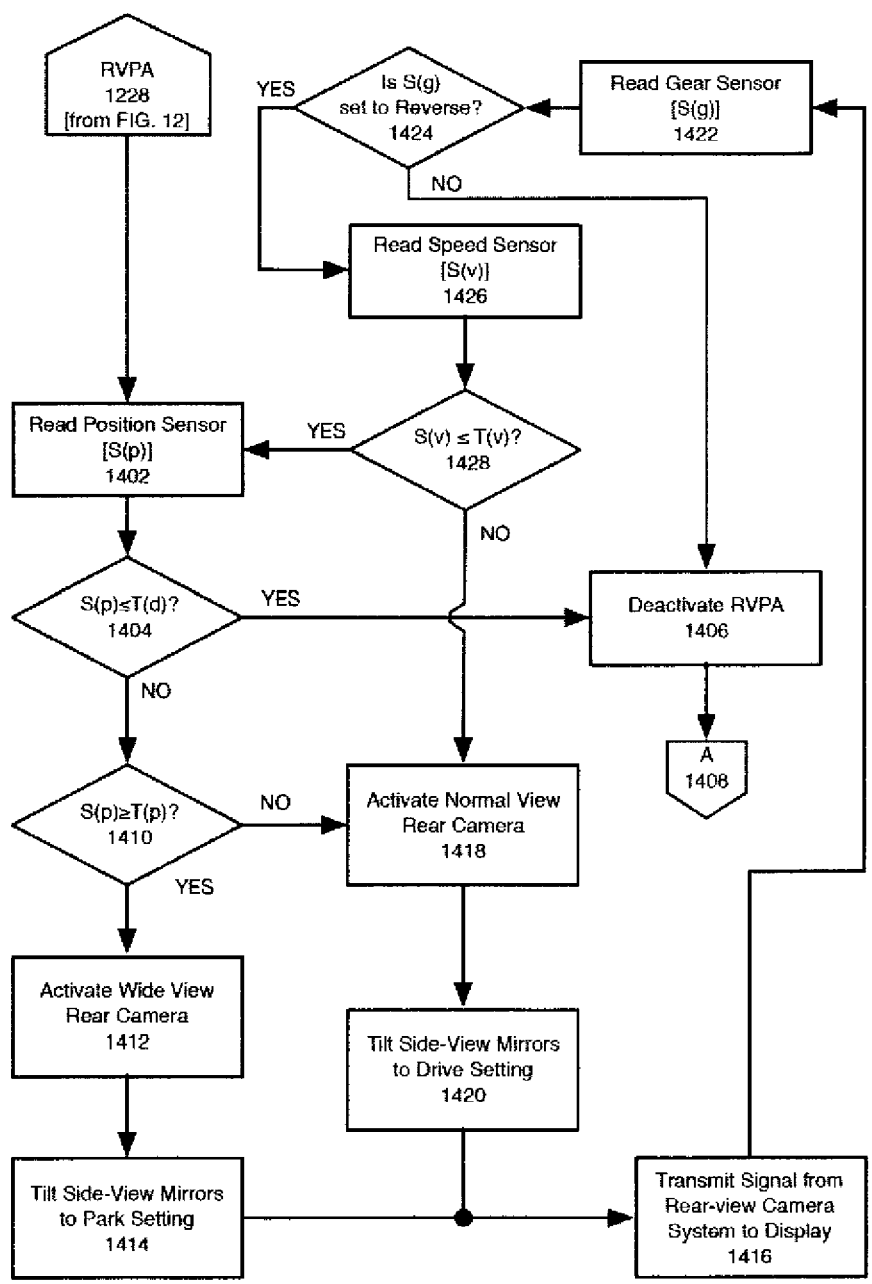

The process then proceeds to initialize position thresholds ($T_{(p)}$, $T_{(d)}$) in step 1210. The position activation threshold ($T_{(p)}$) defines the minimum distance between the driver's head and the predefined point on the driver's seat at which the process will activate either the Forward Blind Spot Assistance system (See: FIG. 13) or the Rear View Parking Assistance System (See: FIG. 14). The position deactivation threshold ($T_{(d)}$), on the other hand, defines a maximum distance from the predefined point on the driver's seat at which the process will deactivate the Forward Blind Spot Assistance system or the Rear View Parking Assistance System. Thus, the position deactivation threshold ($T_{(d)}$) has a value less than the position activation threshold ($T_{(p)}$).

Consequently, when a driver leans forward such that the driver's head surpasses the position activation threshold ($T_{(p)}$), the collision avoidance system activates in accordance with the present disclosure and remains active until the driver resumes a normal driving position once again as determined by the driver's head being closer to the predefined point on the driver's seat than position deactivation threshold ($T_{(d)}$).

Upon completing the initialization steps 1202 through 1210, the process checks whether the vehicle engine is on in step 1212. If the engine is not on, the process enters a loop that either continuously or intermittently performs the check in step 1212. However, if the engine is on, the process proceeds to step 1214 where the position sensor ($S_{(p)}$) is read. In step 1216, the value read from the position sensor ($S_{(p)}$) is compared to the position activation threshold ($T_{(p)}$). If the value read from the position sensor ($S_{(p)}$) is less than the position activation threshold ($T_{(p)}$), the process enters a loop returning back to step 1212.

Alternatively, if the value read from the position sensor ($S_{(p)}$) is greater than or equal to the position activation threshold ($T_{(p)}$), the processes continues to step 1218. At step 1218 the process reads the value from the speed sensor ($S_{(v)}$). In step 1220 the value read from the speed sensor ($S_{(v)}$) is compared to the speed threshold ($T_{(v)}$). If the value read from the speed sensor ($S_{(v)}$) is greater than the speed threshold ($T_{(v)}$), the process enters a loop returning back to step 1212.

However, if in step 1220, the value read from the speed sensor ($S_{(v)}$) is less than or equal to the speed threshold ($T_{(v)}$), the processes continues to step 1222. At step 1222, the gear position is read from the gear sensor ($S_{(g)}$), which is used to determine if the vehicle is in a forward gear or a reverse gear at step 1224. If the vehicle is in reverse gear, the process proceeds to step 1228 to activate the Rear View Parking Assistance System, which is further described below in reference to FIG. 14. However, if the vehicle is not in reverse gear, the process proceeds to step 1226 to activate the Forward Blind Spot Assistance system, which is further described below in reference to FIG. 13.

As apparent to one of ordinary skill in the art, the various sensors and activations may be arranged in alternative configurations as appropriate for a particular implementation. For example, the reverse gear check (step 1224) may be provided prior to the engine check (step 1212) such that the system immediately activates the reverse view camera upon placing the vehicle in reverse gear regardless of the status of the engine. Moreover, two reverse gear checks may be provided one at a position prior to the engine check (e.g., between steps 1210 and 1212) and one at the position shown in FIG. 12.

Further, the reverse gear check, as well as any or all of the other sensors checks, may operate in parallel, i.e., simultaneously and continuously, such that the present invention reacts to changes received from the sensors as they occur rather than being limited to a sequential process flow as shown in FIG. 12 through 14. The above modifications, as well as any other modification as known to one of ordinary skill in the art, are not considered as departing from the present disclosure.

Referring to FIG. 13, in the case where the process described above with reference to FIG. 12 determines that the vehicle is not in reverse gear in step 1224, the process continues to step 1226 where the Forward Blind Spot Assistance system is activated. Activation of the Forward Blind Spot Assistance system includes the step 1302 where the process determines if the Forward Blind Spot Assistance system is already active. If the Forward Blind Spot Assistance system is not already active, then the front-view camera system is activated in step 1304 and the video signals therefrom are transmitted to a display viewable by the driver in step 1322.

However, if the Forward Blind Spot Assistance system is already active in step 1302, the process reads the value from the position sensor ($S_{(p)}$) in step 1306. In step 1308 the value from the position sensor ($S_{(p)}$) is compared to the position deactivation threshold ($T_{(d)}$). If the value of the position sensor ($S_{(p)}$) is less than or equal to the position deactivation threshold ($T_{(d)}$), the process proceeds to step 1318 where the Forward Blind Spot Assistance system is deactivated. Deactivation of the Forward Blind Spot Assistance system includes deactivating the front-view camera as well as any other supporting systems. Once the Forward Blind Spot Assistance system is deactivated the process continues to step 1320, which loops back to step 1212 in FIG. 12.

However, if the value from the position sensor ($S_{(p)}$) is greater than or exceeds the position deactivation threshold ($T_{(d)}$) in step 1308, the process continues to step 1310 where the value of the speed sensor ($S_{(v)}$) is read. The process then compares the value of the speed sensor ($S_{(v)}$) to the speed threshold ($T_{(v)}$) in step 1312. If the value of the speed sensor ($S_{(v)}$) exceeds the speed threshold ($T_{(v)}$), the process proceeds to step 1318 where the Forward Blind Spot Assistance system is deactivated. Once the Forward Blind Spot Assistance system is deactivated the process continues to step 1320, which loops back to step 1212 in FIG. 12.

However, if the value from the speed sensor ($S_{(v)}$) is less than or equal to the speed threshold ($T_{(v)}$) in step 1312, the process continues to step 1314 where the value of the gear sensor ($S_{(g)}$) is read. The process then determines if the gear sensor ($S_{(g)}$) indicates that the vehicle is in a forward gear, or in neutral, in step 1316. If the vehicle is determined to be in a reverse gear (i.e., not in either neutral or a forward gear), the process proceeds to step 1318 where the Forward Blind Spot Assistance system is deactivated. Once the Forward Blind Spot Assistance system is deactivated the process continues to step 1320, which loops back to step 1212 in FIG. 12.

If the vehicle is determined to be in a non-reverse gear (i.e., either neutral or a forward gear), the process proceeds to step 1322 where the video signals from the front view camera system continue to be transmitted to a display viewable by the driver, and the process continues as described above.

Referring to FIG. 14, in the case where the process described above with reference to FIG. 12 determines that the vehicle is in reverse gear in step 1224, the process continues to step 1228 where the Rear View Parking Assistance system is activated. Activation of the Rear View Parking Assistance system includes the step 1402 where the process reads the position sensor ($S_{(p)}$).

After reading the position sensor ($S_{(p)}$) in step 1402, the process compares the value of the position sensor ($S_{(p)}$) against the position deactivation threshold ($T_{(d)}$) in step 1404. If the position sensor ($S_{(p)}$) is less than or equal to the position deactivation threshold ($T_{(d)}$) in step 1404, the process proceeds to step 1406 where the Rear View Parking Assistance system is deactivated and the process continues to step 1408 returning to step 1212 in FIG. 12. When the Rear View Parking Assistance system is deactivated, the side view mirrors are readjusted back to a normal driving configuration and the wide view and the normal view rear cameras are deactivated as well.

Alternatively, if the position sensor ($S_{(p)}$) is greater than the position deactivation threshold ($T_{(d)}$) in step 1404, the process proceeds to step 1410. At step 1410, the value of the position sensor ($S_{(p)}$) is compared against the position activation threshold ($T_{(p)}$). If the position sensor ($S_{(p)}$) is greater than or equal to the position activation threshold ($T_{(p)}$) then the process continues to step 1412. At step 1412 the process activates the wide view rear camera. The wide view rear camera allows the driver to visualize the area of the vehicle near the rear bumper. Next, the process controls the electric mirror adjustment motor 107 (see: FIG. 2), situated in a side-view mirror housing 103, to adjust the side-view mirror 105 to a park setting in step 1414. In the park setting, the side-view mirror is aimed such that the driver 201 has a clear view of the ground at the rear side of the vehicle. The present embodiment may include one or more side-view mirrors. The process then proceeds to step 1416 where the rear-view camera system transmits video signals to a display viewable by the driver.

Additionally, the process reads the state of the gear sensor ($S_{(g)}$) in step 1422. Based on the state of the gear sensor ($S_{(g)}$) the process determines if the vehicle is still in reverse gear in step 1424. If the vehicle is no longer in reverse gear the process proceeds to step 1406 and deactivates the Rear View Parking Assistance system. When the Rear View Parking Assistance system is deactivated, the side view mirrors are readjusted back to a normal driving configuration and the wide view and normal view rear cameras are deactivated as well. The process then continues to step 1408, which loops the process back to step 1212 in FIG. 12. Alternatively, if the vehicle remains in reverse gear as determined in step 1424, the process continues onto step 1402 and proceeds as described above.

If the position sensor ($S_{(p)}$) is less than the position activation threshold ($T_{(p)}$) then the process continues to step 1418. At step 1418 the process activates the normal view rear camera. The normal view rear camera allows the driver to visualize obstacles in a wide area behind the vehicle that could cause a collision while the vehicle is backing up. Next, the process controls the electric mirror adjustment motor 107 (see: FIG. 1), situated in a side-view mirror housing 103, to adjust the side-view mirror 105 to a default drive setting in step 1420. In the default drive setting the side-view mirror 105 provides the driver 101 with a clear view along the side of the vehicle. The process proceeds to step 1416 where the rear-view camera system transmits video signals to the display viewable by the driver.

Additionally, the process reads the state of the gear sensor ($S_{(g)}$) in step 1422. Based on the state of the gear sensor ($S_{(g)}$) the process determines if the vehicle is still in reverse gear in step 1424. If the vehicle is no longer in reverse gear the process proceeds to step 1406 and deactivates the Rear View Parking Assistance system. When the Rear View Parking Assistance system is deactivated, the side view mirrors are readjusted back to a normal driving configuration and the wide view and the normal view rear cameras are deactivated as well. The process then continues to step 1408, which loops the process back to step 1212 in FIG. 12. Alternatively, if the vehicle remains in reverse gear as determined in step 1424, the process continues onto step 1426.

At step 1426, the process reads the state of the speed sensor ($S_{(v)}$). Based on the state of the speed sensor ($S_{(v)}$) the process determines if the vehicle is still below the speed threshold ($T_{(v)}$) in step 1428. If the vehicle is no longer below the speed threshold ($T_{(v)}$), the process proceeds to step 1418. If the vehicle speed is over the speed threshold ($T_{(v)}$), the system switches to normal view rear camera. Alternatively, if the vehicle remains below the speed threshold ($T_{(v)}$) as determined in step 1428, the process continues onto step 1402 and proceeds as described above.

The Rear View Parking Assistance system continues operating until the vehicle is shifted out of reverse gear as determined in step 1424 or the position sensor ($S_{(p)}$) returns a value less than or equal to the position deactivation threshold ($T_{(d)}$) in step 1404.

Those of ordinary skill would appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the disclosure.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blue-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present disclosure. Various modifications to these exemplary embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A vehicle collision avoidance system comprising:
a camera disposed on a vehicle and arranged to monitor at least one blind spot adjacent to said vehicle;
a sensor positioned within said vehicle and arranged to detect a distance between a driver's head and a driver's seat headrest in said vehicle resulting from a natural movement of said driver to lean in a direction forward and away from said seat headrest to improve visibility by altering said driver's view angle;
a display coupled to said camera and disposed in view of said driver; and
a controller configured to be activated by the natural forward-leaning movement of the driver to control operation of said sensor, said camera and said display, the controller being configured to activate said display and said camera to display said at least one blind spot adjacent to said vehicle when said sensor detects that a distance between said driver's head and said seat headrest is beyond a threshold distance.

2. The vehicle collision avoidance system as in claim 1, wherein said camera is a wide field of view camera disposed on a rear area of said vehicle and arranged to image an area near a rear bumper of said vehicle and encompassing both rear sides of said vehicle.

3. The vehicle collision avoidance system as in claim 2, further comprising a normal field of view camera disposed on a rear area of said vehicle and arranged to image the area behind said vehicle, said normal field of view camera being coupled to said display and operationally controlled by said controller.

4. The vehicle collision avoidance system as in claim 3, wherein said wide field of view camera and said normal field of view camera are provided in a single camera with a field of view adjustable by said controller.

5. The vehicle collision avoidance system as in claim 1, further comprising an electronically adjustable side-view mirror, wherein said side-view mirror is controllably adjusted by said controller in response to said driver's head position.

6. The vehicle collision avoidance system as in claim 1, wherein said camera is disposed at a forward area of said vehicle and arranged to image a region encompassing both sides of said vehicle forward of a front of said vehicle.

7. The vehicle collision avoidance system as in claim 1, wherein said threshold distance is a first threshold distance corresponding to an activation threshold distance at which said controller activates said display and said camera to display said at least one blind spot; and wherein said sensor is further arranged to detect a second threshold distance between said driver's head and said seat headrest, said second threshold distance corresponding to a deactivation threshold distance at which said controller is configured to deactivate said display and said camera so as to stop displaying said at least one blind spot, said activation threshold distance being greater than said deactivation threshold distance.

8. A vehicle collision avoidance method for a motor vehicle, comprising the steps of:
detecting a forward-leaning movement by a driver;
evaluating said forward-leaning movement to determine if said forward-leaning movement exceeds a threshold distance between a head of the driver and a driver's seat headrest; and
activating a collision avoidance process when said forward-leaning movement exceeds said threshold distance between the driver's head and the seat headrest;
wherein said collision avoidance process comprises the steps of:
detecting whether said motor vehicle is in a non-reverse gear;
activating a front-view camera when said motor vehicle is in said non-reverse gear; and
transmitting a video signal from said front-view camera to a display viewable by said driver.

9. The method as in claim 8, wherein said front-view camera has at least a 180° field of view forward of said motor vehicle.

10. The method as in claim 9, wherein said front-view camera comprises a plurality of cameras configured to provide said 180° field of view.

11. The method as in claim 8, wherein said collision avoidance process further comprises the steps of:
detecting whether said motor vehicle is in a reverse gear;
activating a rear-view camera when said motor vehicle is in said reverse gear; and
transmitting a video signal from said rear-view camera to a display viewable by said driver.

12. The method as in claim 11, wherein said rear-view camera is configured to provide view behind said motor vehicle.

13. A vehicle collision avoidance method for a motor vehicle, comprising the steps of:
detecting a forward-leaning movement by a driver;
evaluating said forward-leaning movement to determine if said forward-leaning movement exceeds a threshold distance between a head of the driver and a driver's seat headrest; and
activating a collision avoidance process when said forward-leaning movement exceeds said threshold distance between the driver's head and the seat headrest, said collision avoidance process comprising the steps of:
detecting whether said motor vehicle is in a reverse gear;
activating a rear-view camera when said motor vehicle is in said reverse gear, said rear-view camera being configured to provide view behind said motor vehicle;
transmitting a video signal from said rear-view camera to a display viewable by said driver;
processing said video signal transmitted from said rear-view camera to provide a normal view to said driver when said forward-leaning movement is less than said threshold distance and greater than a second threshold distance between the driver's head and the seat headrest; and
processing said video signal transmitted from said rear-view camera to provide a wide angle view to said driver when said forward-leaning movement exceeds said threshold distance between the driver's head and the seat headrest.

14. The method as in claim 13, wherein said collision avoidance process further comprises the steps of:
adjusting a side-view mirror to provide a side parking view to said driver when said forward-leaning movement exceeds said threshold distance between the driver's head and the seat headrest; and
adjusting said side-view mirror to provide a normal driving view to said driver when said forward-leaning movement is less than said threshold distance and greater than said second threshold distance between said driver's head and said seat headrest.

15. A vehicle collision avoidance system, comprising:
a first sensor configured to determine a distance between a driver and a surface of a seat;
a second sensor configured to detect a transmission gear selection;
a third sensor configured to sense a traveling velocity of said vehicle;
a first camera system positioned at a front-most position on said vehicle and oriented to image an area encompassing at least 180° around the front of said vehicle;
a second camera system positioned at a rear-most position on said vehicle;
a display adapted to display a video to said driver; and
a controller in electrical communication with said first sensor, said second sensor, said third sensor, said first camera system, said second camera system, and said display, the controller being configured to provide video feeds from said first camera system and said second camera system based on an analysis of data provided to the controller by said first sensor, said second sensor, and said third sensor.

16. The system as in claim 15, wherein said analysis of data comprises the first, second and third sensors being configured to:
determine if said distance between said driver and said surface of said seat exceeds a first threshold;
detect if said transmission gear is a reverse gear; and
sense if said traveling velocity of said vehicle is below a speed threshold ranging from 1 to 10 MPH.

17. The system as in claim 16, wherein said controller selectively provides said video feed from said first camera system to said display when said distance between said driver and said surface of said seat exceeds said first threshold, said transmission gear is not in said reverse gear, and said traveling velocity of said vehicle is below said speed threshold.

18. The system as in claim 16, wherein said controller selectively provides said video feed from said second camera system to said display when said distance between said driver and said surface of said seat exceeds said first threshold, said transmission gear is in said reverse gear, and said traveling velocity of said vehicle is below said speed threshold.

19. The system as in claim 16, further comprising a side-view mirror adjustment motor controlled by said controller, wherein said controller drives said side-view mirror adjustment motor to adjust a side-view mirror to a default position when said traveling velocity of said vehicle is above said speed threshold, and
said controller drives said side-view mirror adjustment motor to adjust a side-view mirror to a reverse parking position when said distance between said driver and said surface of said seat exceeds said first threshold, said transmission gear is in said reverse gear, and said traveling velocity of said vehicle is below said speed threshold.

20. The system as in claim 15, wherein said second camera is a wide field of view camera arranged to image an area near a rear bumper of the vehicle and encompassing both rear sides of said vehicle.

21. The system as in claim 20, further comprising a normal field of view camera disposed on a rear area of said vehicle and arranged to image the area behind said vehicle, said normal field of view camera being coupled to said display and operationally controlled by said controller.

22. The system as in claim 21, wherein said wide field of view camera and said normal field of view camera are provided in a single camera with a field of view adjustable by said controller.

23. A vehicle collision avoidance method, comprising:
receiving data corresponding to a distance between a driver and a surface of a seat, a transmission gear selection and a traveling velocity of said vehicle;
providing video feeds from a first camera system positioned at a front-most position on said vehicle and oriented to image an area encompassing at least 180° around the front of said vehicle, the video feeds from the first camera system being configured to be transmitted to a display viewable by said driver; and
providing video feeds from a second camera system positioned at a rear-most position on said vehicle, the video feeds from the second camera system being configured to be transmitted to a display viewable by said driver;
wherein said video feeds from said first camera system and said second camera system are provided based on an analysis of the received data.

24. The method of claim 23, wherein the data is received from a plurality of respective sensors in electrical communication with a controller configured to provide said video feeds from said first camera system and said second camera system based on the analysis of the received data.

* * * * *